(12) United States Patent
Fabio

(10) Patent No.: US 6,513,777 B1
(45) Date of Patent: Feb. 4, 2003

(54) MOUSE HOUSE

(76) Inventor: Joseph Fabio, 69 Stewart Ave., Stewart Manor, NY (US) 11530

( * ) Notice: Subject to any disclaimer, the term of this patent is extended or adjusted under 35 U.S.C. 154(b) by 0 days.

(21) Appl. No.: 10/175,176

(22) Filed: Jun. 18, 2002

Related U.S. Application Data

(60) Provisional application No. 60/298,640, filed on Jun. 18, 2001.

(51) Int. Cl.[7] .............................................. B65D 85/57
(52) U.S. Cl. .................. 248/346.01; 248/917; 248/918; 248/118; 248/118.1; 312/263
(58) Field of Search ............................... 248/918, 917, 248/118, 118.1, 118.3, 118.5, 396.01; 312/263

(56) References Cited

U.S. PATENT DOCUMENTS

| | | | | |
|---|---|---|---|---|
| 4,538,861 A | | 9/1985 | Hughes, Jr. ................. 312/244 |
| 5,244,710 A | * | 9/1993 | Bricher et al. .............. 428/100 |
| 5,542,637 A | | 8/1996 | Schriner ............... 248/346.01 |
| 5,692,815 A | | 12/1997 | Murphy ....................... 312/238 |
| 5,732,910 A | * | 3/1998 | Martin ........................ 248/118 |
| D411,192 S | * | 6/1999 | Wu ......................... D14/117.3 |
| 6,332,533 B1 | * | 12/2001 | Howisen .................. 206/307.1 |
| 6,362,809 B2 | * | 3/2002 | Mattson ....................... 345/156 |
| 6,367,706 B1 | * | 4/2002 | Putz ............................... 239/6 |
| 6,441,805 B1 | * | 8/2002 | Reid et al. .................. 345/163 |
| 6,446,928 B1 | * | 9/2002 | Oliver ..................... 248/346.01 |

* cited by examiner

*Primary Examiner*—Anita King
*Assistant Examiner*—Steven Marsh
(74) *Attorney, Agent, or Firm*—Matthew J. Peirce

(57) ABSTRACT

A mouse pad that includes secured storage space and a directory is disclosed. The mouse pad would comprise a base and two top-mounted doors. The base would have a height of at least one inch and possibly up to few inches. Within the base, a user could store disks, compact discs, digital video discs, writing utensils, or other items. The doors would be secured by a combination lock that would be attached to the center edges of both doors. The top surface of either door would either have a top-mounted written directory attached to it which would allow for a user to place needed information or an erasable writing pad, which a user would be able to erase whenever desired. The mouse pad would also optionally have a plurality of suction cups, with at least one suction cup attached to each corner of the bottom of the mouse pad. Each suction cup could be used to secure the mouse pad effectively to the top surface of a desk or other flat surface.

6 Claims, 2 Drawing Sheets

MOUSE HOUSE

This application claims benefit of U.S. Provisional Application Ser. No. 60/298,640, filed Jun. 18, 2001.

I. BACKGROUND OF THE INVENTION

The present invention concerns that of a new and improved mouse pad that includes secured storage space and a directory.

II. DESCRIPTION OF THE PRIOR ART

U.S. Pat. No. 5,692,815, issued to Murphy, discloses a mouse pad and item holder having a top surface with a mouse tracking surface.

U.S. Pat. No. 5,542,637, issued to Schriner, discloses a mouse pad for supporting a computer mouse.

U.S. Pat. No. 4,538,861, issued to Hughes, Jr., discloses a portable desk of the kind having an exterior working or writing surface and internal compartments for storing writing or work-related items.

III. SUMMARY OF THE INVENTION

The present invention concerns that of a new and improved mouse pad that includes secured storage space and a directory. The mouse pad would comprise a base and two top-mounted doors. The base would have a height of at least one inch and possibly up to few inches. Within the base, a user could store disks, compact discs, digital video discs, writing utensils, or other items. The doors would be secured by a combination lock that would be attached to the center edges of both doors. The top surface of either door would either have a top-mounted written directory attached to it which would allow for a user to place needed information or an erasable writing pad, which a user would be able to erase whenever desired. The mouse pad would also optionally have a plurality of suction cups, with at least one suction cup attached to each corner of the bottom of the mouse pad. Each suction cup could be used to secure the mouse pad effectively to the top surface of a desk or other flat surface.

There has thus been outlined, rather broadly, the more important features of a mouse pad that the detailed description thereof that follows may be better understood and in order that the present contribution to the art may be better appreciated. There are, of course, additional features of the mouse pad that will be described hereinafter and which will form the subject matter of the claims appended hereto.

In this respect, before explaining at least one embodiment of the mouse pad in detail, it is to be understood that the mouse pad is not limited in its application to the details of construction and to the arrangements of the components set forth in the following description or illustrated in the drawings. The mouse pad is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present mouse pad. It is important, therefore, that the claims be regarded as including such equivalent constructions insofar as they do not depart from the spirit and scope of the present invention.

It is therefore an object of the present invention to provide a mouse pad which has all of the advantages of the prior art and none of the disadvantages.

It is another object of the present invention to provide a mouse pad which may be easily and efficiently manufactured and marketed.

It is another object of the present invention to provide a mouse pad which is of durable and reliable construction.

It is yet another object of the present invention to provide a mouse pad which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Priority is hereby claimed to application No. 60/298,640, filed on Jun. 18, 2001.

Figure 1:
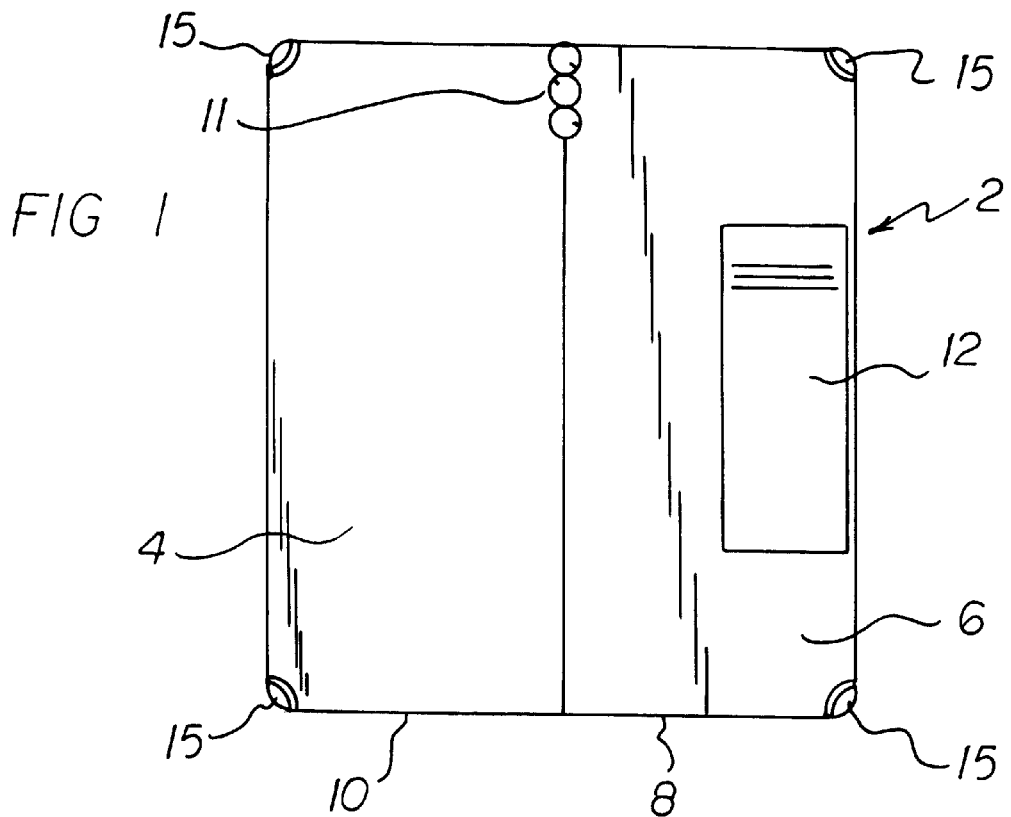
FIG. 1 shows a top view of the present invention.
Figure 2:
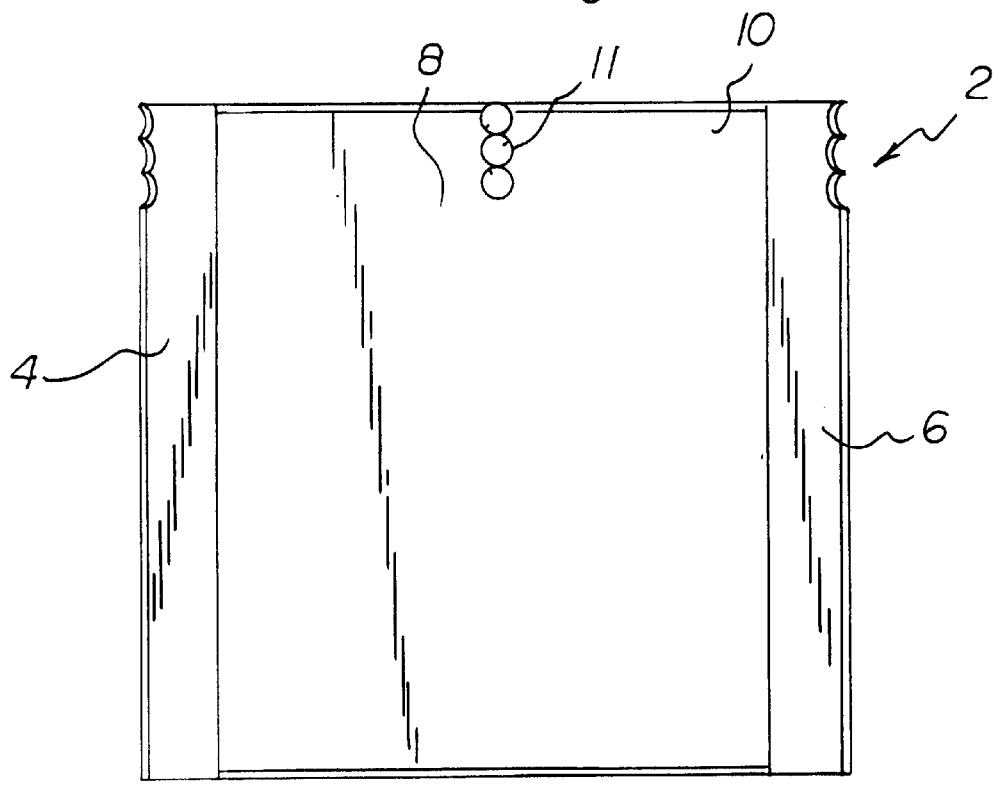
FIG. 2 shows a top view of the present invention after the two doors have been opened.

FIG. 1 shows a top view of the present invention, while FIG. 2 shows a top view of the present invention after the two doors have been opened. Mouse pad 2 comprises base 8, which has a top surface and bottom surface. Mouse pad 2 also includes top-mounted doors 4 and 6, which would allow a user to access the contents within base 8. Base 8 has a continuous side edge 10 around the perimeter of base 8 to which the doors 4 and 6 would be pivotally attached. Base 8 is square-shaped, with doors 4 and 6 each occupying about half the cover space of mouse pad 2. Base 8 would have four corners.

Continuous side edge 10 is designed to be at least one inch high, and could be up to a few inches in height. Continuous side edge 10 would comprise four separate sides attached to one another in a square shape, the four separate sides comprising a first side, a second side, a third side, and a fourth side. The first side and the third side would be opposite one another, while the second side and the fourth side would be opposite one another.

Doors 4 and 6 would each have four edges comprising a top edge, a bottom edge, an attached edge, and a center edge, and would also have two surfaces, a top surface and a bottom surface. The top edge and the bottom edge of doors 4 and 6 would rest on top of the continuous side edge 10 when doors 4 and 6 would be closed. The attached edge of doors 4 and 6 would be the portion of doors 4 and 6 that would be pivotally attached to the first side and the third side of the continuous side edge 10 of base 8. When the doors 4 and 6 would be in a closed position, the center edge of door 4 would be flush against the center edge of door 6. By keeping the center edges of doors 4 and 6 flush against one another, a user could use the mouse pad 2 with a computer mouse and not have to worry about the computer mouse getting stuck on the junction created by the center edges of doors 4 and 6.

Doors 4 and 6 could be secured by a combination lock 11 that would be attached to the center edges of both doors. The combination lock 11 would be placed on mouse pad 2 on the center edges of both doors, allowing a user to lock doors 4 and 6 shut when the present invention would not be in use or when so desired by a user. Combination lock 11 would have a specific combination that could be changed by a user, when and if desired.

The top surface of either door 4 or door 6 would have a top-mounted directory 12 attached to it. The directory 12 would allow for a user to place needed information on a visible, yet out-of-the-way, format. Directory 12 would not interfere with the operation of a computer mouse that would be used with mouse pad 2. Directory 12 would either be a written entry-type directory, or in the alternative, would be an erasable directory which would be erasable as desired.

Mouse pad 2 would also have a plurality of suction cups 15, with a single suction cup 15 being attached to the bottom surface of each corner of mouse pad 2. Each suction cup 15 could be used to secure mouse pad 2 effectively to the top surface of a desk or other flat surface.

FIG. 2 shows a top view of the present invention after doors 4 and 6 have been opened. Doors 4 and 6 would be designed to swing outward a little more than ninety degrees, but would not be designed to pivot back until doors 4 and 6 would touch a flat surface upon which mouse pad 2 would be resting. If allowed to extend this far out, doors 4 and 6 might be damaged. When the doors 4 and 6 would be shut, a user could store disks, compact discs, digital video discs, writing utensils, or other items within base 8.

Figure 3:
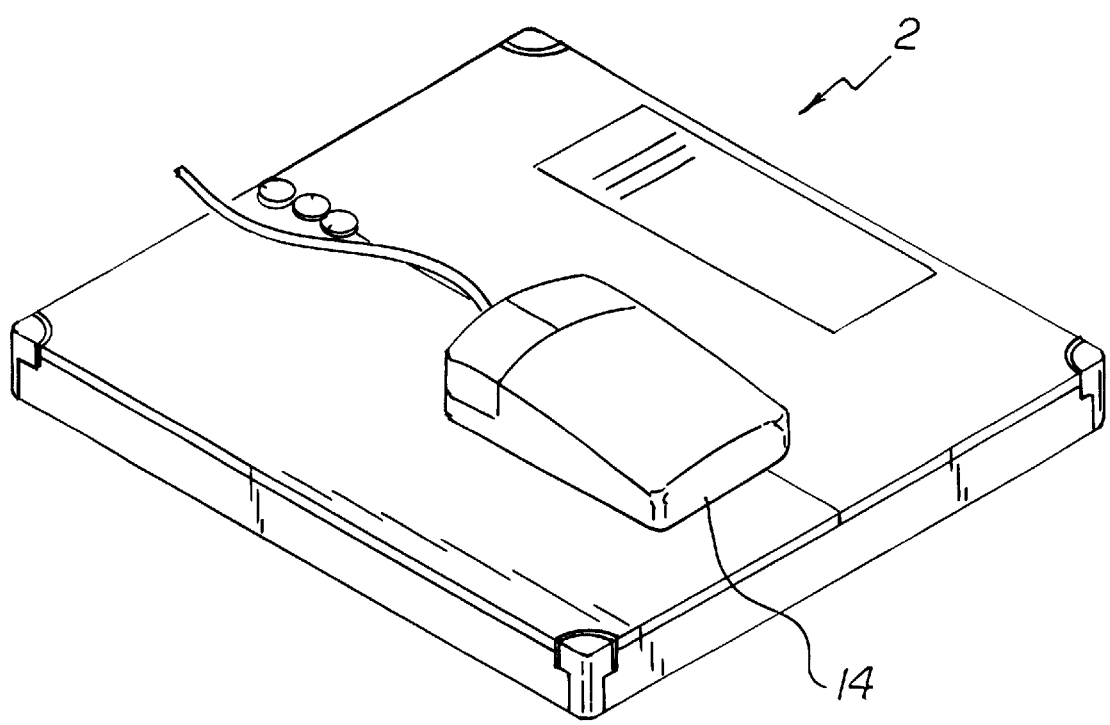
FIG. 3 shows the present invention as it would appear while in use.

FIG. 3 shows the present invention as it would appear while in use. Mouse 14 would be used on the top of mouse pad 2, with mouse pad 2 being treated as a standard mouse pad that are commonly available in stores and markets.

What I claim as my invention is:

1. A mouse pad comprising:
   (a) a base having two surfaces, a top surface and bottom surface, the base having a square shape, the base also having four corners,
   (b) a continuous side edge attached to the top surface of the base around the perimeter of the base, the continuous side edge being at least one inch in height, the continuous side edge comprising four separate sides attached to one another in a square shape, the four separate sides comprising a first side, a second side, a third side, and a fourth side, the first side and the third side being opposite one another, and the second side and the fourth side being opposite one another,
   (c) a pair of top-mounted doors, a first door and a second door, each door having four edges, a top edge, a bottom edge, an attached edge, and a center edge, each door having two surfaces, a top surface and a bottom surface, the attached edge of the first door pivotally attached to the first side of the continuous side edge, the attached edge of the second door pivotally attached to the third side of the continuous side edge, wherein the center edge of the first door would be flush with the center edge of the second door when the doors would be in a closed position,
   (d) a combination lock, the combination lock being attached to the center edge of the first door and the second edge of the second door, the combination lock having a specific combination to lock and unlock the pair of top-mounted doors, and
   (e) a directory attached to the top surface of either the first door or the second door.

2. A mouse pad according to claim 1 wherein the mouse pad would further comprise a plurality of suction cups, the plurality of suction cups comprising at least four suction cups, wherein at least one suction cup is attached to each corner of the base.

3. A mouse pad according to claim 2 wherein the height of the continuous side edge is between one and three inches.

4. A mouse pad according to claim 3 wherein the specific combination to lock and unlock the pair of top-mounted doors could be altered at the discretion of an individual.

5. A mouse pad according to claim 4 wherein the directory is attached to the top surface of the first door.

6. A mouse pad according to claim 5 wherein the directory is attached to the top surface of the second door.

* * * * *